(12) United States Patent
Ijzerman et al.

(10) Patent No.: US 8,149,342 B2
(45) Date of Patent: Apr. 3, 2012

(54) CONTROLLING THE PERCEIVED DEPTH OF AUTOSTEREOSCOPIC DISPLAY DEVICE AND METHOD THEREFOR

(75) Inventors: Willem Libertus Ijzerman, Eindhoven (NL); Oscar Hendrikus Willemsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 675 days.

(21) Appl. No.: 12/097,395

(22) PCT Filed: Dec. 4, 2006

(86) PCT No.: PCT/IB2006/054579
§ 371 (c)(1),
(2), (4) Date: Jun. 13, 2008

(87) PCT Pub. No.: WO2007/069122
PCT Pub. Date: Jun. 21, 2007

(65) Prior Publication Data
US 2008/0316380 A1    Dec. 25, 2008

(30) Foreign Application Priority Data
Dec. 14, 2005   (EP) ..................... 05112181

(51) Int. Cl.
*G02F 1/1347* (2006.01)
*G02B 27/22* (2006.01)
*H04N 13/00* (2006.01)

(52) U.S. Cl. ............... 349/15; 349/77; 349/200; 345/6; 348/59; 359/462

(58) Field of Classification Search .................. 349/15, 349/74, 77, 95, 200; 359/461–467, 620–622; 348/51, 59, E13.029; 345/32, 6
See application file for complete search history.

(56) References Cited

U.S. PATENT DOCUMENTS

| | | | |
|---|---|---|---|
| 7,215,475 B2 * | 5/2007 | Woodgate et al. | 359/624 |
| 2004/0222945 A1 * | 11/2004 | Taira et al. | 345/6 |
| 2005/0190443 A1 | 9/2005 | Nam et al. | |
| 2007/0008617 A1 * | 1/2007 | Shestak et al. | 359/455 |

FOREIGN PATENT DOCUMENTS

| | | |
|---|---|---|
| EP | 1394593 A1 | 3/2004 |
| EP | 1566975 A1 | 8/2005 |
| GB | 2196166 A | 4/1988 |
| GB | 2405519 A | 3/2005 |
| JP | 09203980 A | 8/1997 |
| WO | W09821620 A1 | 5/1998 |
| WO | W02004038486 A1 | 5/2004 |
| WO | W02004070467 A2 | 8/2004 |

* cited by examiner

Primary Examiner — David Nelms
Assistant Examiner — Tai Duong
(74) Attorney, Agent, or Firm — Larry Liberchuk

(57) ABSTRACT

An autostereoscopic display device comprises: a display panel having an array of display pixels for producing a display, the pixels being arranged in rows and columns; and at least two arrays of light output directing elements, the arrays being arranged in series over the display panel at different depths, each array being controllable to direct the light output from respective groups of pixels in different directions to enable a stereoscopic image to be perceived. The device is operable to selectively control any one of the arrays to provide the light output directing function, thereby providing respective first and second three dimensional display modes having different amounts of perceived depth.

17 Claims, 7 Drawing Sheets

CONTROLLING THE PERCEIVED DEPTH OF AUTOSTEREOSCOPIC DISPLAY DEVICE AND METHOD THEREFOR

This invention relates to an autostereoscopic display device of the type that comprises a display panel having an array of display pixels for producing a display and a plurality of imaging means, such as lenticular elements, arranged over the display panel and through which the display pixels are viewed.

A known autostereoscopic display device is described in GB 2196166 A. This known device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticular element is associated with two columns of display pixels, the display pixels in each column provide a vertical slice of a respective two dimensional sub-image. The lenticular sheet directs these two slices and corresponding slices from the display pixel columns associated with the other lenticular elements, to the left and right eyes of a user positioned in front of the sheet, so that the user observes a single stereoscopic image.

In other arrangements, each lenticular element is associated with a group of four or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

The above described device provides an effective three dimensional display device. However, it will be appreciated that, in order to provide stereoscopic views, there is a necessary sacrifice in the horizontal resolution of the device.

Furthermore, in order to provide a three dimensional display from which the user perceives a significant amount of "depth", a further sacrifice in horizontal resolution is required. This further sacrifice in horizontal resolution is due to an inherent characteristic of the three dimensional lattice of virtual volume elements that are created by the display. These elements, known as a virtual voxels, have a width which is directly proportional to their depth in front of or behind the lenticular elements of the display device. Thus, a display which exhibits a large amount of depth tends to have virtual voxels which are correspondingly large, and suffers a correspondingly large reduction in resolution.

It has been proposed to provide a display having a large amount of depth, without a resolution penalty, by increasing a distance between the display panel pixels and the lenticular elements. However, such a display has the undesirable characteristic that a viewing area in which a three dimensional image is perceived becomes undesirably small, and a viewing distance becomes excessively large for many applications. Such a device is unsuitable for use with text display applications, where the viewing distance is typically small.

According to the invention, there is provided an autostereoscopic display device comprising: a display panel having an array of display pixels for producing a display, the pixels being arranged in rows and columns; and at least two arrays of light output directing elements, the arrays being arranged in series over the display panel at different depths, each array being controllable to direct the light output from respective groups of pixels in different directions to enable a stereoscopic image to be perceived, wherein the device is operable to selectively control any one of the arrays to provide the light output directing function, thereby providing respective first and second three dimensional display modes having different amounts of perceived depth.

The invention thus provides an autostereoscopic display device having a number of different three dimensional display modes, each provided by a respective array of light output directing elements. In each mode, all of the arrays, except for the one providing the light output directing function, behave as if they were an ordinary sheet of transparent material.

The arrays are spaced from the display panel by different distances, thereby enabling each of the display modes to have different characteristics, including different amounts of perceived depth, i.e. the ability to produce virtual voxels a different maximum depths from a display plane, at a given resolution. For example, each display mode may provide different horizontal resolutions, so that the first mode may provide a smaller amount of perceived depth but higher horizontal resolution, and the second mode may provide a larger amount of perceived depth but lower resolution.

In this case, the first mode may be a monitor mode for viewing from close range. Such a viewing experience benefits from a relatively high display resolution, especially for text display applications. The second mode may be a television mode for viewing from longer distances. Such a viewing experience benefits from a relatively large amount of perceived depth.

Each array of light output directing elements may comprise an electro-optic material. In this case, the array may be controllable to provide the light output directing function by applying an electrical potential to the electro-optic material to alter its refractive index. In effect, the light output directing function of the array may be switched on or off. The electro-optic material may comprise a liquid crystal material. Those skilled in the art will appreciate that if a (birefringent) liquid crystal material is employed, such as nematic liquid crystal, then it will be necessary for light of a particular polarization to be input to the array of light output directing elements in order to achieve switching of the light output directing function.

Each array of light output directing elements may comprise an array of parallel lenticular elements formed as a sheet of the electro-optic material. The lenticular elements may each have a planar surface on one side and a convex profiled surface on their other side. Such lenticular elements have been found to be particularly suitable for providing an efficient autostereoscopic display device.

The lenticular elements of respective different arrays may be parallel to each other. For example, the different display modes provided by the different arrays may all provide a horizontal parallax effect, as is usual for an autostereoscopic display device employing lenticular elements.

Alternatively, the lenticular elements of respective different arrays may be non-parallel to each other. For example, as shown in FIG. 10, the lenticular elements may be perpendicular, in order to provide display modes providing horizontal and vertical parallax effects.

A lenticular element pitch of the array positioned furthest from the display panel may be greater than the lenticular element pitch of the closer array. A ratio of the lenticular element pitches of the arrays may be equal to a ratio of the distances of the arrays from the display panel. Such an arrangement may provide different display modes having substantially the same viewing areas.

The electro-optic material may be disposed between transparent electrodes for applying the electric potential to the electro-optic material.

The device may be further operable to control the arrays so that neither of them provides a light output directing function. In this way, an ordinary two dimensional display mode is provided, which is ideal for the text display applications.

Within practical limits, the display device may comprise any number of arrays of light output directing elements, the device then providing a corresponding number of three dimensional display modes having various characteristics. For example, different modes may provide different combinations of perceived depth, horizontal resolution and viewing area position and size.

The display panel may be a liquid crystal display panel. The display pixels of the panel may have a rectangular shape, the longer edges of the display pixels extending in the column direction. The rows and columns of display pixels may be orthogonal, and a display pixel may be provided at every intersection of the display pixel rows and columns.

According to another aspect of the invention, there is provided a method of operating a display device to provide an autostereoscopic display, the display device comprising a display panel having an array of display pixels, and at least first and second arrays of light output directing elements arranged in series over the display panel at different depths, the method comprising: selecting one of first and second three dimensional display modes, the display modes each providing different amounts of perceived depth; and controlling a respective one of the arrays of light output directing elements to direct the light output from respective groups of pixels in different directions to enable a stereoscopic image to be perceived, the other of the arrays being controlled not to provide a light output directing function.

Each array of light output directing elements may comprise an electro-optic material, the array being controllable to provide the light output directing function by applying an electrical potential to the electro-optic material to alter its refractive index.

The electro-optic material may comprise a liquid crystal material.

An embodiment of the invention will now be described, purely by way of example, with reference to the accompanying drawings, in which.

Figure 7:
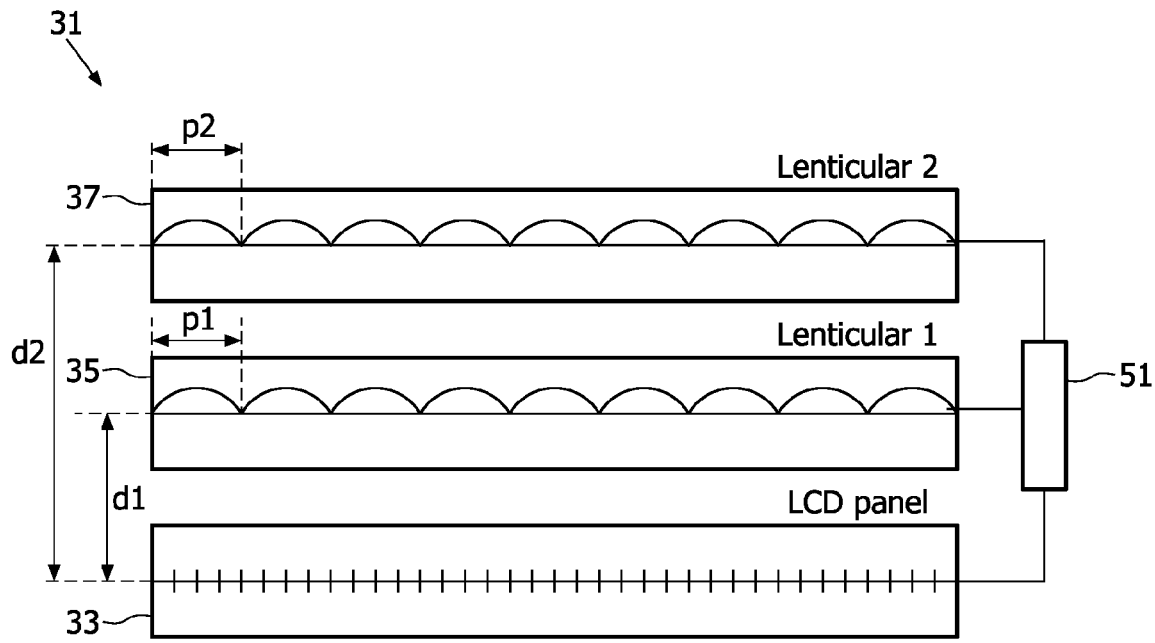
Figure 8A:
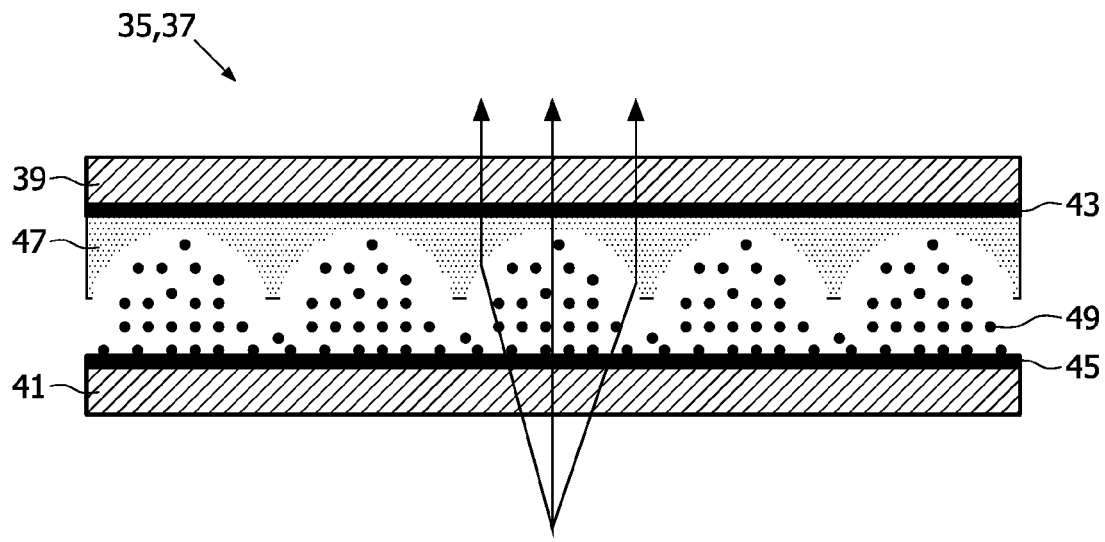
Figure 8B:
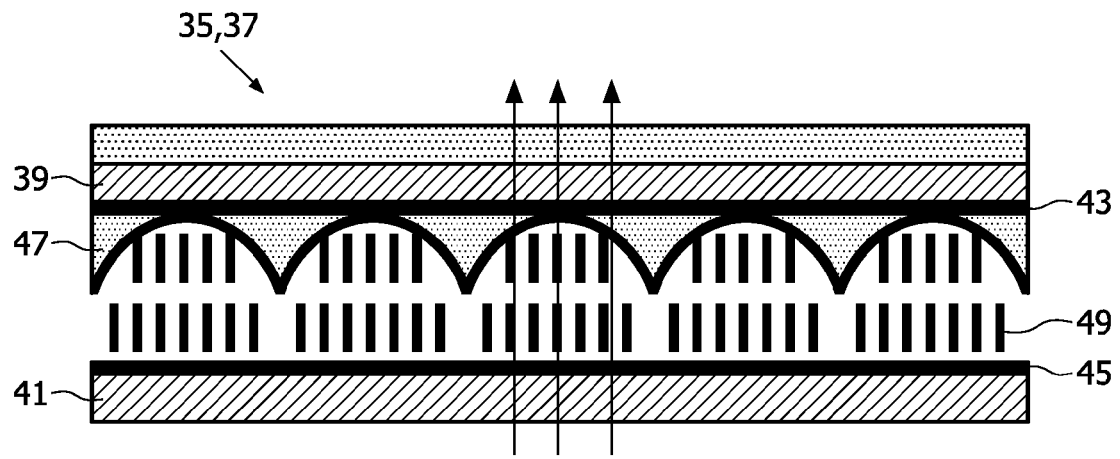
Figure 9A:
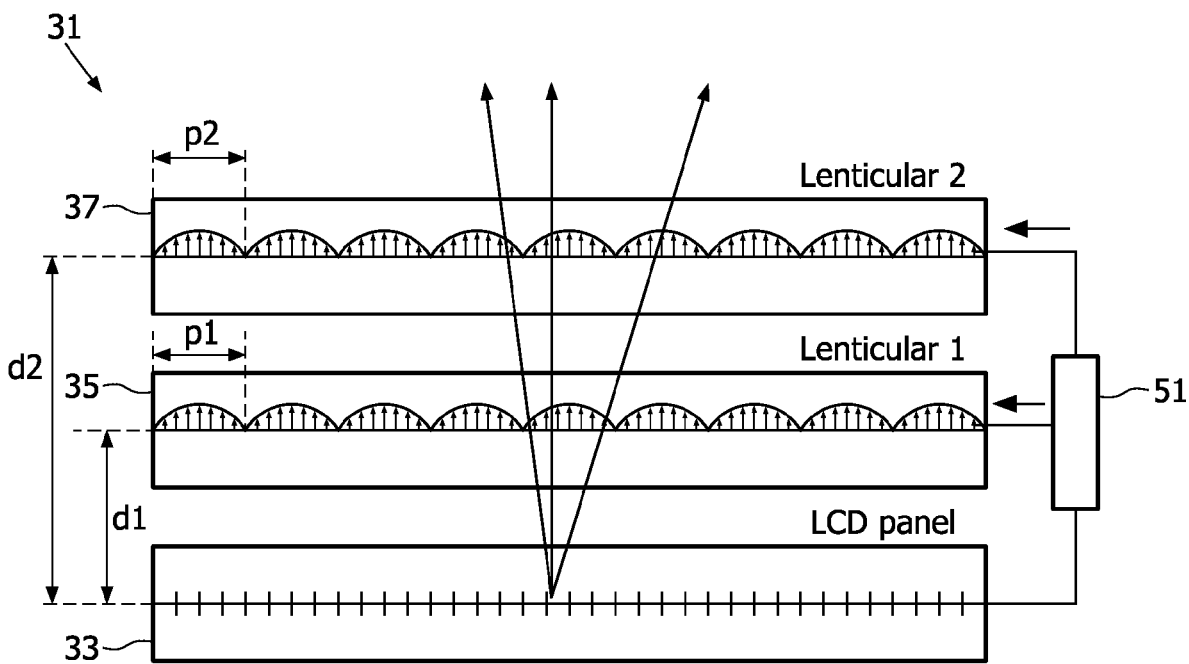
Figure 9B:
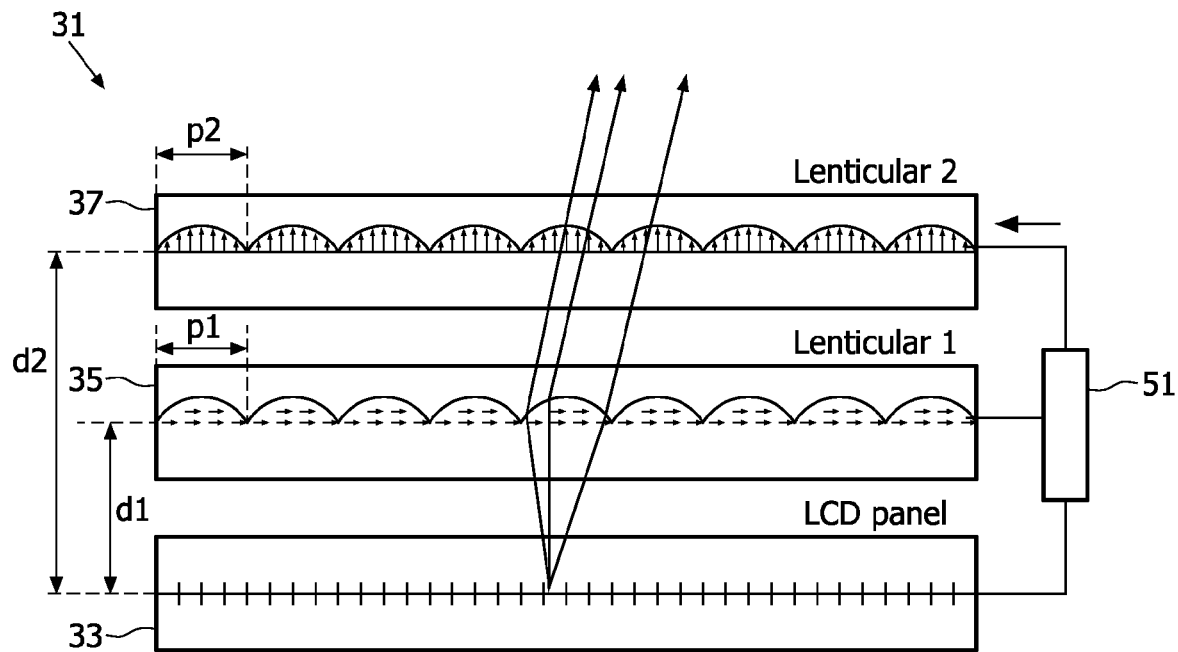
Figure 9C:
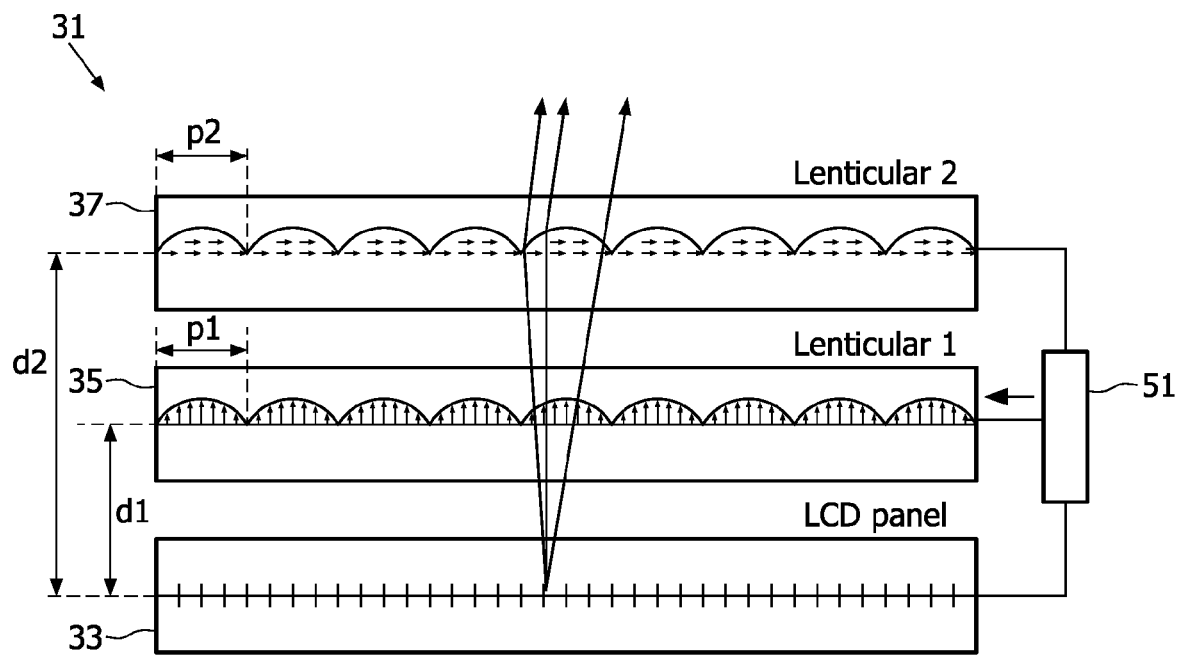

FIG. 7 schematically shows an autostereoscopic display device according to the invention;

FIGS. 8A and 8B are used to explain the operating principle of a particular element of the display device shown in FIG. 7; and FIGS. 9A to 9C are used to explain the operating principle of the display device shown in FIG. 7.

Figure 10:
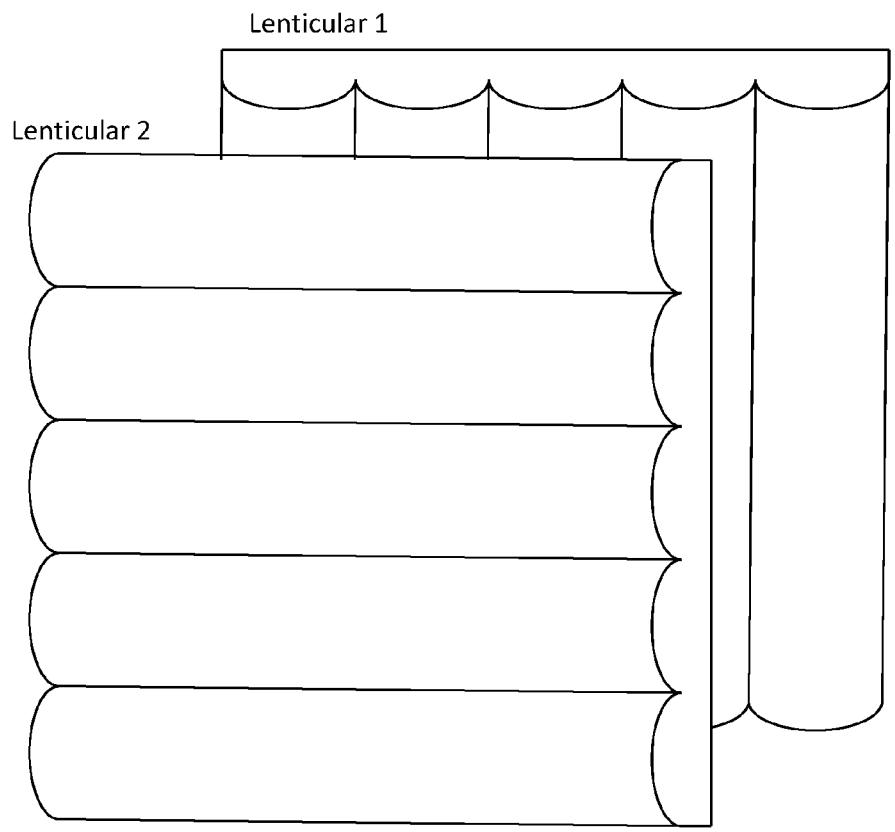

FIG. 10 shows the orientations of the different lenticular arrays according to an embodiment of the invention.

Figure 11:
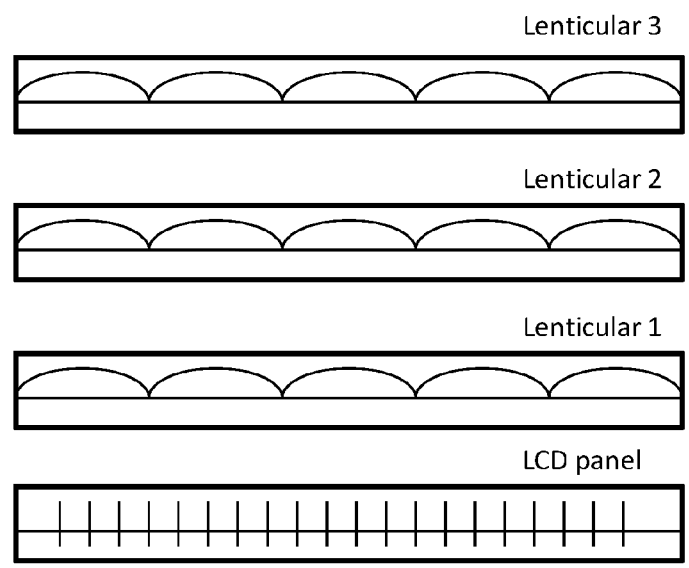

FIG. 11 shows a display device having multiple arrays of lenticular element according to an embodiment of the invention.

The invention provides a display device having a number of different three dimensional display modes, each provided by a respective array of light output directing elements positioned in front of a display panel. In each mode, all of the arrays, except for the one providing the light output directing function, behave as if they were an ordinary sheet of transparent material. The arrays are spaced from the display panel by different distances, thereby enabling each of the display modes to have different characteristics, including different amounts of perceived depth.

Figure 1:
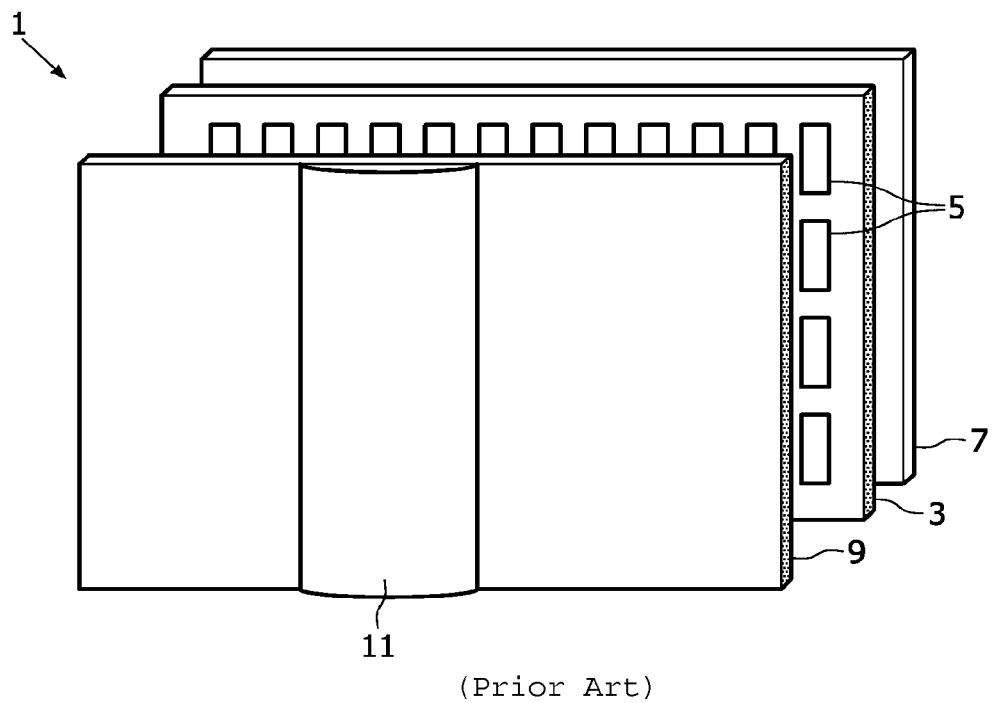
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

A problem associated with the known autostereoscopic display device 1 described above is that the amount of three dimensional depth perception that can be provided is limited, in order to avoid excessive resolution loss. In practice, the depth is frequently limited to ±1 mm.

The relationship between depth and resolution loss will now be described with reference to FIGS. 2 to 6, which schematically show elements of the display device described with reference to FIG. 1.

Figure 2:
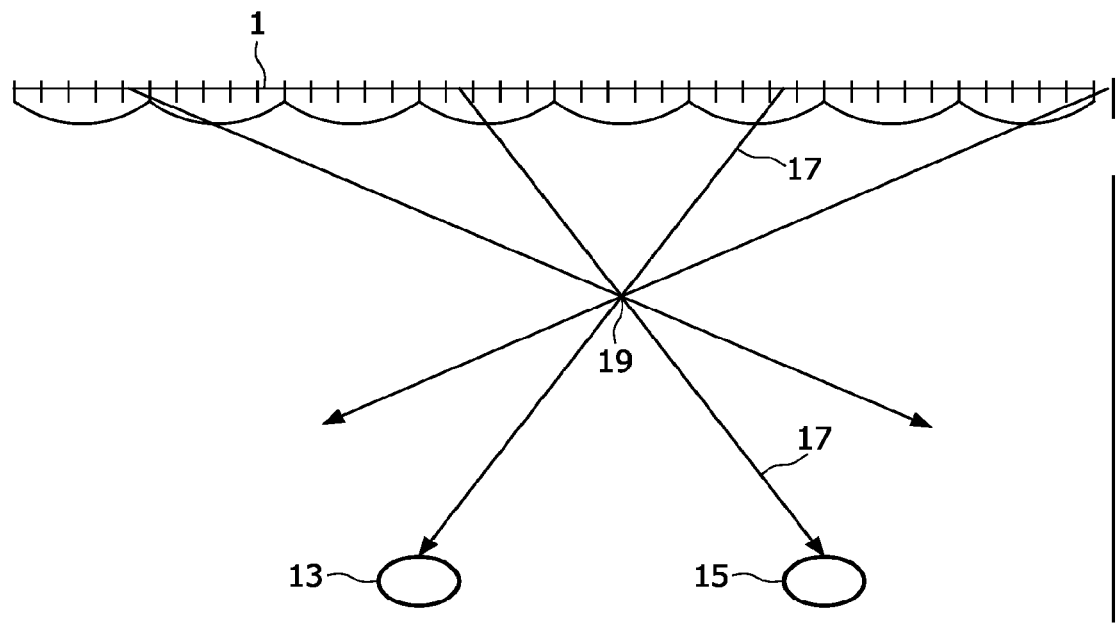
FIGS. 2 to 6 are used to explain the operating characteristics of a display device of the type shown in FIG. 1.

Referring to FIG. 2, the autostereoscopic display device 1 is positioned in front of the left and right eyes 13, 15 of a user. In the display device 1, rays of light 17 from certain pixels of the display panel that are switched "on" are directed by the array of lenticular elements to create a virtual pixel 19 in front of the display device 1. This virtual pixel 19 is called a voxel. The distance between the display device 1 and the voxel 19 is perceived by the user as "depth". Of course, only rays of light that are observed by the eyes contribute to the perception of the voxel 19.

Figure 3:
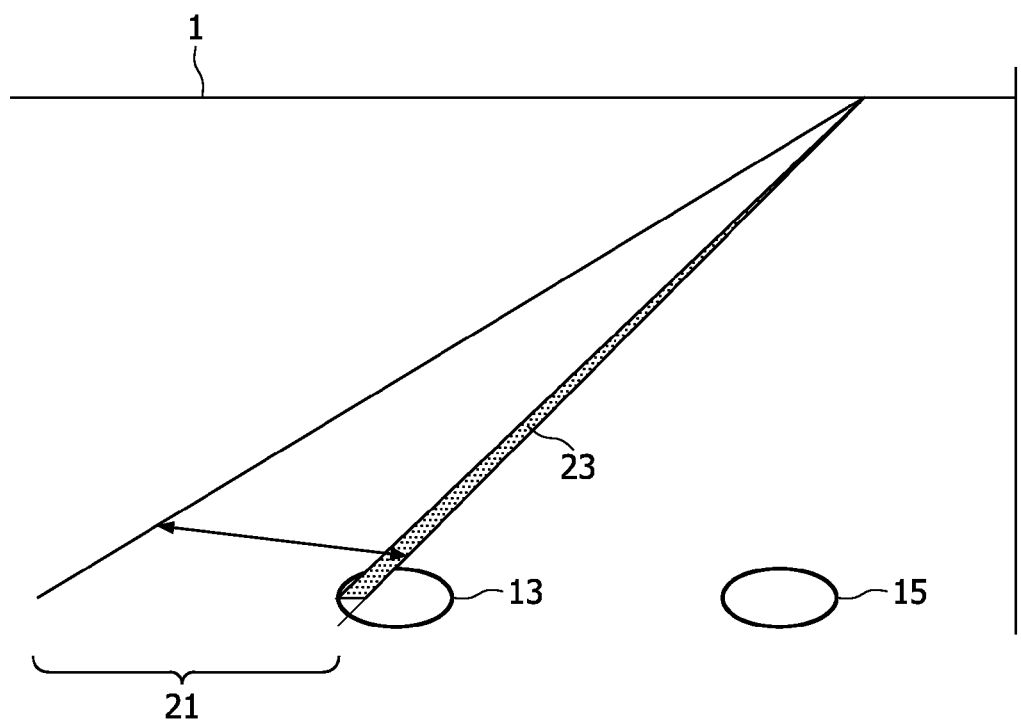

In practice, the lenticular elements of the display device 1 do not simply project a single ray of light 17 from a respective display pixel, as indicated in FIG. 2. Instead, each lenticular element projects a "pencil" of rays 21, which is directed towards the left or right eye 13, 15 of the user. The pencil of rays 21 becomes broader as the viewing distance increases. Accordingly, when a pencil of rays 21 from a lenticular element is projected towards an eye 13 of the user, as shown in FIG. 3, only a small band of the rays 23 are directly observed by the eye 13. Other rays 25 of the pencil 21 are not observed by the eye 13.

Figure 4:
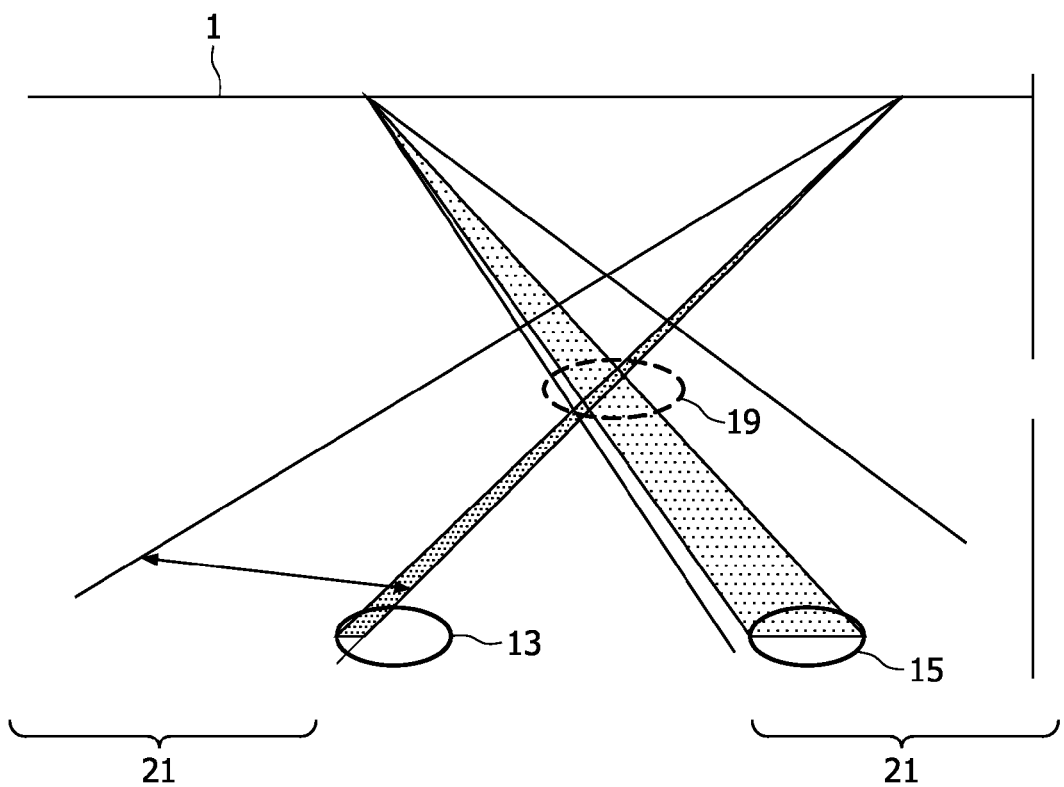

The effect of the pencils of rays 21 on the creation of a voxel 19 in front of the display device 1 is shown in FIG. 4. As can be seen, two pencils 21 are directed by different lenticular elements to converge in front of the display device, thereby creating a voxel 19. The width of the voxel 19 is dependent on the widths of the bands of rays received by the eyes 13, 15, and the angle at which they cross each other.

Of course, pencils of rays 21 from a large number of lenticular elements are projected from the display device 1. Although the user observes only a part of each pencil of rays 21, the combined effect of all of these pencils of rays 21 is that the user perceives a large voxel 19 in front of the display device 1. This is illustrated in FIG. 5.

Figure 5:
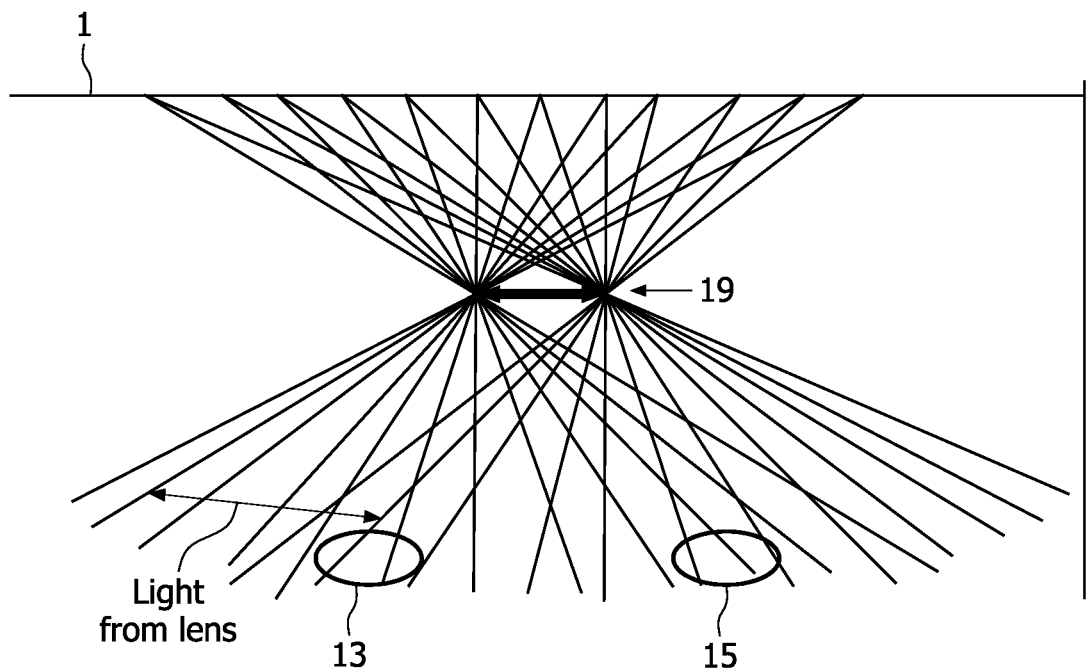
Figure 6:
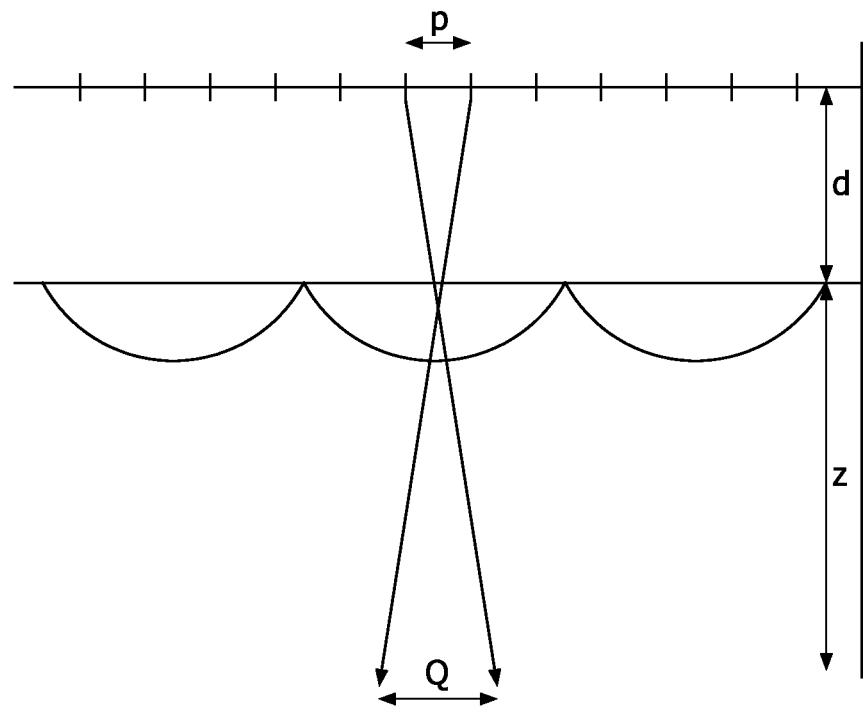

It can be shown that the width of the voxel 19 shown in FIG. 5 is defined by the following equation:

$$Q = np\frac{Z}{d} \quad (1)$$

where Q is the width of the voxel 19, d is the distance between the pixels of the display panel 1 and the array of lenticular elements, p is the width of the display panel pixels and Z is the distance between the voxel 19 and the array of lenticular elements. These parameters are illustrated in FIG. 6.

Equation (1) shows that, for a display device having a distance between the pixels and the array of lenticular elements d of 1 mm, resolution is reduced by a factor of 15 to provide a perceived "depth" of 10 mm. This resolution loss is unacceptable for applications in which the display will be observed at close range, such as displaying text. However, it is not possible to provide a display device having both high resolution and a large amount of perceived "depth".

The above described problem is addressed by an autostereoscopic display device according to the invention, shown schematically in FIG. 7. The device 31 shown in FIG. 7 is similar in many ways to the device 1 shown in FIG. 1. In particular, the device 31 comprises a display panel 33, including a light source, that are identical to those described above with reference to FIG. 1.

The display device 31 shown in FIG. 7 differs from that of FIG. 1 in that it comprises first and second of arrays of lenticular elements 35, 37, which each has a different structure to the array of lenticular elements shown in FIG. 1.

The structure and operation of each of the arrays 35, 37 will now be described with reference to FIGS. 8A and 8B.

FIGS. 8A and 8B schematically show an array of lenticular elements 35, 37, as employed in the device 31 shown in FIG. 7. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Nematic liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in the Figure. Surfaces of the inverse lens structure 47 and the lower substrate 41 that are in contact with the liquid crystal material are also provided with an orientation layer (not shown) for orientating the shaped liquid crystal material.

FIG. 8A shows the array when no electric potential is applied to the electrodes 43, 45. In this state, the refractive index of the liquid crystal material 49 is substantially higher than that of the inverse lens array 47, and the lenticular shapes therefore provide a light output directing function, as illustrated.

FIG. 8B shows the array when an alternating electric potential of approximately 50 volts is applied to the electrodes 43, 45. In this state, the refractive index of the liquid crystal material 49 is substantially the same as that of the inverse lens array 47, so that the light output directing function of the lenticular shapes is cancelled, as illustrated. Thus, in this state, the array effectively acts in a "pass through" mode.

Those skilled in the art will appreciate that the change in refractive index of the liquid crystal material 49 is only for light having a particular polarization. Thus, it will be understood that a light polarizing means must be incorporated within the structure of the display device 31 to ensure that light output from the display panel 33 enters the liquid crystal material 49 of the arrays suitably polarized.

Further details of the structure and operation of arrays of light output directing elements suitable for use in the display device 31 shown in FIG. 7 can be found in U.S. Pat. No. 6,069,650 and in WO 98/21620, the entire contents of which are incorporated herein by reference.

Referring back to FIG. 7, it can be seen that the first and second arrays of lenticular elements 35, 37 are positioned over the display panel 33 in series, and are spaced from the display panel 33 by different distances, which distances are labeled as d1 and d2, respectively. Referring to the Figure, d2 is greater than d1. d1 is typically 2 mm and d2 is typically 4 mm. However, d1 may alternatively be anywhere in the range 1 mm to 5 mm and d2 may alternatively be anywhere in the range 2 mm to 10 mm.

The pitch between adjacent lenticular elements of the arrays is labeled in the Figure as P1 and P2 respectively, although no difference in pitch is shown as the Figure is schematic. The lenticular element pitches are to some degree dictated by the display pixel pitch of the display panel 33 and the number of separate views to be provided by the display device 31. However, the lenticular element pitches are also selected so that display device 31 has a common viewing area for all of its display modes. Such an arrangement is achieved by setting a ratio of the lenticular element pitches to be equal to a ratio of the distances between the display panel 33 and the arrays 35, 37, as represented by the following equation:

$$\frac{P1}{P2} = \frac{d1}{d2} \quad (2)$$

This pitch difference is not shown in the Figures, which are only schematic.

The display device 31 shown in FIG. 7 also comprises a controller 51. The controller 51 is operable to selectively apply an electrical potential across the electrodes of either or both of the arrays 35, 37, according to a display mode selected by the user. The controller 51 is also operable to modify the driving signals for the display panel 33 according to the display mode selected by the user, as described below.

FIG. 9A shows a two dimensional display mode of the display device 31. In the two dimensional mode, an electrical potential is applied across the electrodes of both arrays 35, 37. Accordingly, both arrays 35, 37 act in the "pass through" mode, without providing any light output direction function. The two dimensional display mode provides a single view having the same resolution as that of the display panel 33, and is therefore ideally suited for use as a text display mode. As a two dimensional display mode, the no "depth" is provided to the display.

FIG. 9B shows a first three dimensional display mode of the display device 31. In the first three dimensional mode, the electrical potential is applied across the electrodes of the second array 37 only. Accordingly, the second array 37 acts in the "pass through" mode, without providing any light output directing function. The first array 35 does not act in the "pass through" mode, and instead provides a light output directing function.

FIG. 9C shows a second three dimensional display mode of the display device 31. In the second three dimensional mode, the electrical potential is instead applied across the electrodes of the first array 35 only. Accordingly, the first array 35 acts in the "pass through" mode, without providing any light output directing function. The light output directing function is then provided by the second array 37, which does not act in the "pass through" mode.

Accordingly, the two three dimensional display modes differ in that the light output directing function is provided by arrays that are spaced from the display panel 33 by different distances. The spacing in the second mode shown in FIG. 9C is larger than in the first mode shown in FIG. 9B. Consequently, in the second mode, the opening angle of the views is smaller, and the perceived depth that can be provided in the mode is larger, i.e. d in equation (1) is larger in the second mode than in the first mode.

Thus, a display 31 is provided which can be switched between two three dimensional modes. In the first mode, the light output directing function is provided by an array 35 that is closer to the display panel 33. This mode provides a limited amount of perceived depth, but high resolution, and is therefore suitable for use in a "monitor" application where high resolution is more important. In the second mode, the light output directing function is provided by an array 37 that is further from the display panel 33. This mode provides a much greater amount of perceived depth, but has lower resolution, and is therefore suitable for use in a "television" application where perceived depth is more important.

As mentioned above, the lenticular element pitches of the arrays 35, 37 are different. Accordingly, when a user switches between modes, including the two dimensional mode, it is necessary to drive the display panel 33 with display data in a different format. The format of the display data can be changed at source. However, in the exemplary device shown in FIG. 7, the controller 51 includes processing means for processing raw display data into the required format for each display mode.

A specific example of the invention has been described above. However, it will be apparent to those skilled in the art that various changes and modifications may be made to these embodiments, without departing from the scope of the invention. For example, a display device having two three dimensional display modes has been described. However, it will be apparent to those skilled in the art that any number of three dimensional display modes may be provided, simply by providing a corresponding number of arrays of lenticular elements. FIG. 11 shows an embodiment display device with three arrays of lenticular elements. Similarly, it will be apparent that the two dimensional mode may be omitted.

The example described above employs lenticular elements comprising liquid crystal having a switchable refractive index. However, graded index (GRIN) lenses may alternatively be employed as light output directing elements, as will be understood by those skilled in the art.

The example described above employs a liquid crystal display panel having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

In one example not described above, a display panel having a very fast response time could be used, with the lenticular elements of different arrays being sequentially addressed in time. In this way, the "depths" of the different arrays could be combined to provide a display having a very large "depth".

The example described above comprises separate and distinct arrays of lenticular elements, which are themselves separate from the display panel. However, in other examples, substrates of the components could be combined to reduce the part count.

The display device described above may employ lenticular elements that are slanted at an acute angle to the column direction of the display pixels, as is known in conventional autostereoscopic display devices.

Each array of lenticular elements may be switchable locally, instead of as a whole. For example, the array may be provided with patterned electrodes enabling only certain areas of the array to be switched, or electrodes may only extend over a limited area of the array. In this way, different display modes may be provided in different windows of the display area.

The invention claimed is:

1. An autostereoscopic display device comprising:
   a display panel having an array of display pixels for producing a display, the pixels being arranged in rows and columns; and
   at least two arrays of light output directing elements, the arrays being arranged in series over the display panel at different depths, each array being controllable to direct the light output from respective groups of pixels in different directions to enable a stereoscopic image to be perceived, wherein the device selectively controls any one of the arrays to provide the light output directing function, thereby providing respective first and second three dimensional display modes having different amounts of perceived depth, and wherein the display panel is driven with display data in a format that depends on which of the arrays is being selectively controlled to provide the light output directing function.

2. The autostereoscopic display device according to claim 1, wherein each array of light output directing elements comprises an electro-optic material, the array being controllable to provide the light output directing function by applying an electrical potential to the electro-optic material to alter its refractive index.

3. The autostereoscopic display device according to claim 2, wherein each array of light output directing elements comprises an array of parallel lenticular elements formed of the electro-optic material.

4. The autostereoscopic display device according to claim 3, wherein lenticular elements of respective different arrays are parallel to each other.

5. The autostereoscopic display device according to claim 3, wherein lenticular elements of respective different arrays are not parallel to each other.

6. The autostereoscopic display device according to claim 4, wherein a ratio of the lenticular element pitches of the arrays is equal to a ratio of the separations of the arrays from the display panel.

7. The autostereoscopic display device according to claim 2, wherein the electro-optic material comprises a liquid crystal material.

8. The autostereoscopic display device according to claim 2, wherein the electro-optic material is disposed between transparent electrodes, the electrodes being for applying the electric potential to the electro-optic material.

9. The autostereoscopic display device according to claim 1, wherein the device further controls the arrays so that neither provides the light output directing function, thereby providing a two dimensional display mode.

10. The autostereoscopic display device according to claim 1, comprising more than two arrays of light output directing elements, the device providing a corresponding number of three dimensional display modes.

11. The autostereoscopic display device according to claim 1, wherein the display pixels have a rectangular shape, the longer edges of the display pixels extending in the column direction.

12. The autostereoscopic display device according to claim 1, wherein the rows and columns of display pixels are orthogonal.

13. The autostereoscopic display device according to claim 1, wherein the display panel is a liquid crystal display panel.

14. The autostereoscopic display device according to claim 1, wherein a display pixel is provided at every intersection of the display pixel rows and columns.

15. A method of operating a display device to provide an autostereoscopic display, the display device comprising a display panel having an array of display pixels, and first and second arrays of light output directing elements arranged in series over the display panel at different depths, the method comprising:

selecting one of first and second three dimensional display modes, the display modes each providing different amounts of perceived depth;

controlling a respective one of the arrays of light output directing elements to direct the light output from respective groups of pixels in different directions to enable a stereoscopic image to be perceived, the other of the arrays being controlled not to provide a light output directing function, and driving the display panel with display data in a format that depends on which of the arrays is being controlled to provide the light output directing function.

16. The method according to claim 15, wherein each array of light output directing elements comprises an electro-optic material, the array being controllable to provide the light output directing function by applying an electrical potential to the electro-optic material to alter its refractive index.

17. The method according to claim 16, wherein the electro-optic material comprises a liquid crystal material.

* * * * *